Dec. 28, 1965  H. NEWMAN ETAL  3,226,707
AUTOMOTIVE MESSAGE INDICATOR
Filed June 20, 1963  2 Sheets-Sheet 1
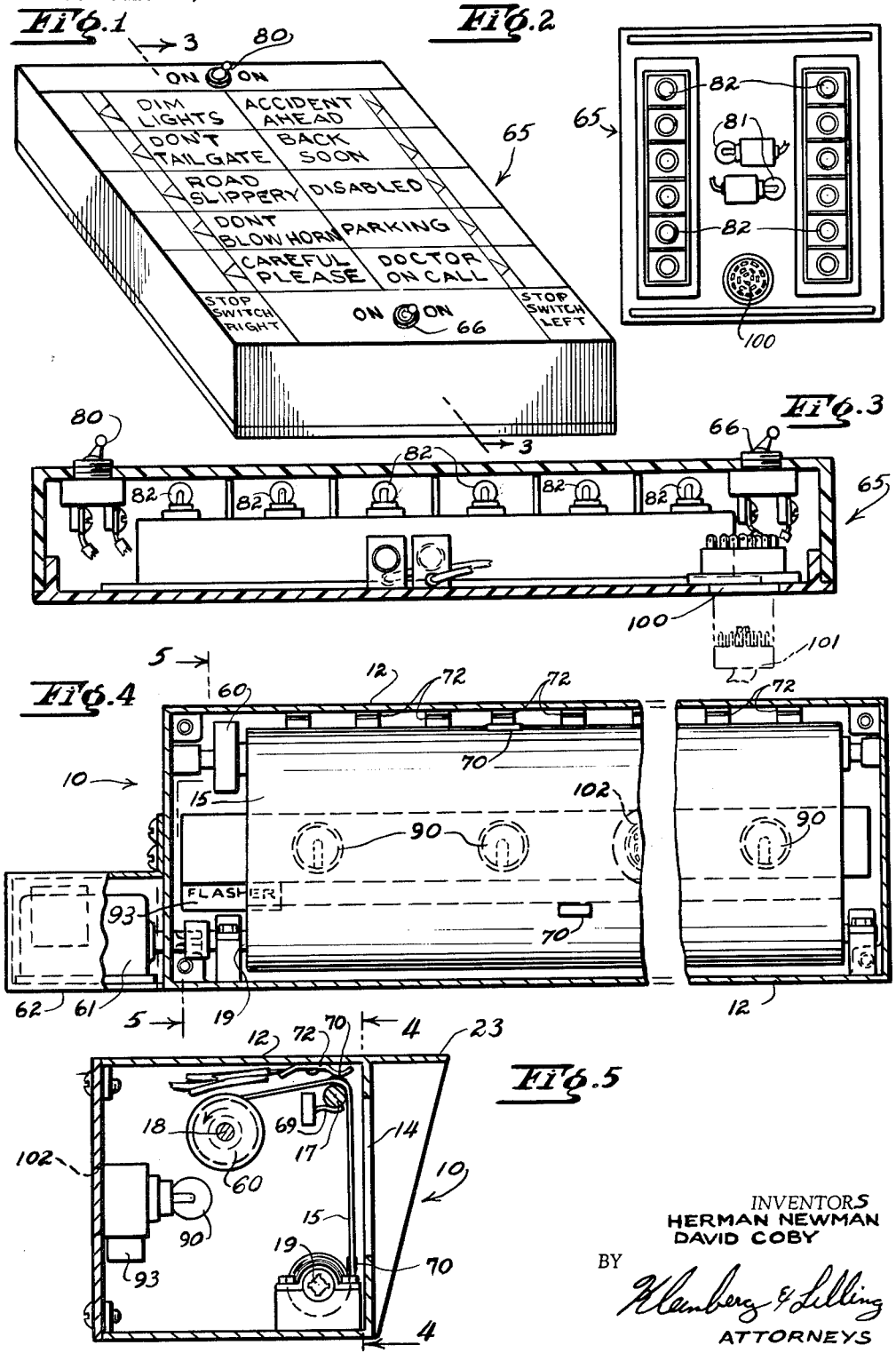
INVENTORS
HERMAN NEWMAN
DAVID COBY
BY
ATTORNEYS Dec. 28, 1965  H. NEWMAN ETAL  3,226,707
AUTOMOTIVE MESSAGE INDICATOR
Filed June 20, 1963  2 Sheets-Sheet 2
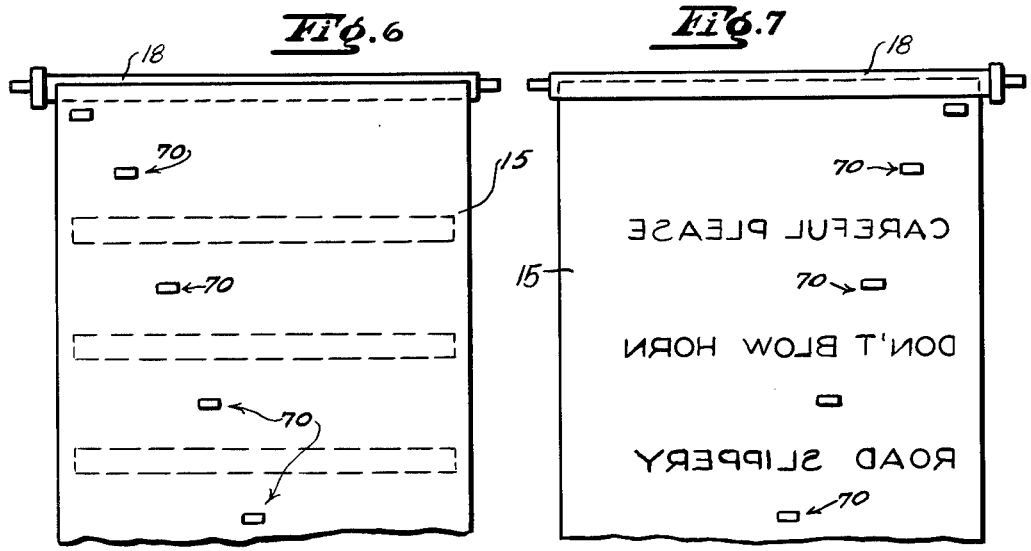
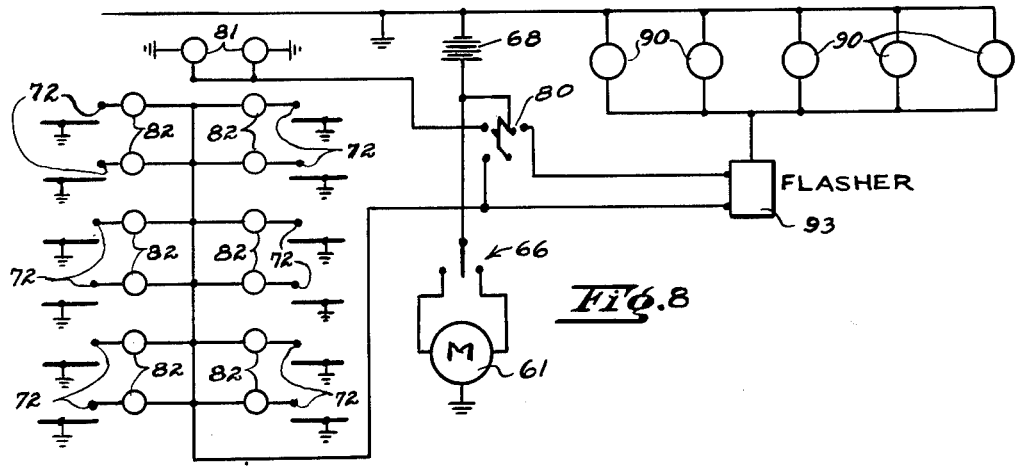
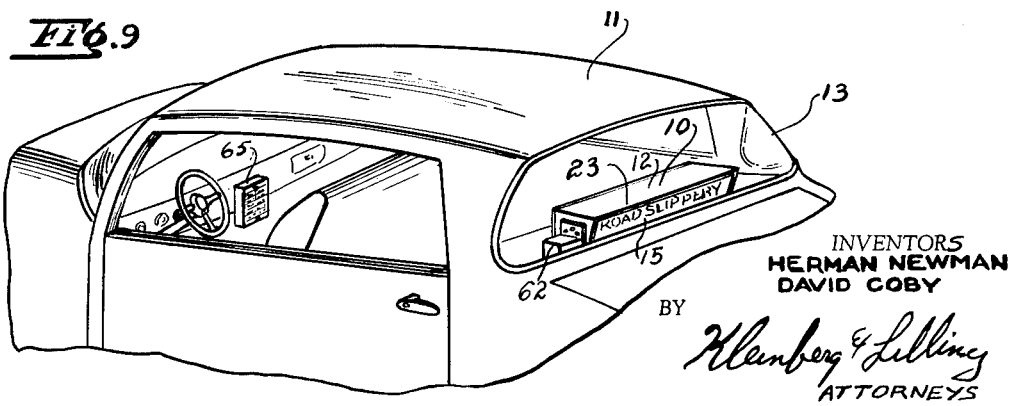
INVENTORS
HERMAN NEWMAN
DAVID COBY
BY
ATTORNEYS United States Patent Office 3,226,707
Patented Dec. 28, 1965

3,226,707
AUTOMOTIVE MESSAGE INDICATOR
Herman Newman, 715 Fairmont Place, Bronx, N.Y., and
David Coby, 345 W. 86th St., New York, N.Y.
Filed June 20, 1963, Ser. No. 289,271
3 Claims. (Cl. 340—324)

This is a continuation-in-part of our co-pending application Serial No. 223,766 filed September 14, 1962 for an Automotive Indicator.

The invention here presented is broadly in the automotive art; more specifically it presents an indicator for use in conjunction with an automotive vehicle; and in detail, it is concerned with means whereby an operator of a vehicle may indicate to others any of a series of predetermined messages.

Automotive safety and convenience are of prime importance today. While many varieties and types of such devices have been made available, there is still an area that has been left unsatisfied. It is often important for the operator of a vehicle to indicate to others certain messages. At present, a driver may signal only by utilizing hand signals, directional indicators, and brake lights. Other important conditions may not be indicated. For example, it is often desirable to indicate to another driver in the rear that he is tailgating or driving too close. At other times, it may be important to indicate to a driver in the rear some emergency condition ahead which might not be otherwise apparent or to warn of some emergency condition. Additionally, messages may be important while parked, such as "Doctor on Call." It will be realized that the varieties of types of information to be transmitted are almost endless.

It is a cardinal object of this invention, therefore, to provide an automotive message indicator whereby the driver of a vehicle may indicate a predetermined message to others.

Another important object and accomplishment hereof is to set forth an indicating device for use at the rear of vehicles.

Still another object and accomplishment of the invention described herein is to set forth a device as above-described that will be economical and relatively easy to produce, and that may be installed within the car during the manufacture thereof, or thereafter; or may be constructed as an integral portion of the car.

A further purpose of the device herein is the provision of a message indicator at the rear of vehicles which may be controlled and operated from the front dashboard thereof.

A still further purpose and object of this invention is the provision of a device as above-described that will indicate any of a plurality of messages almost instantaneously and without the delay normally encountered when changing from one message to another.

With these objects in view, the invention consists of the novel features of construction and arrangement of parts which will appear in the following specification and recited in the appended claims reference being had to the accompanying drawings in which the same reference numerals indicate the same parts throughout the various figures and in which:

FIG. 1 is a perspective view of a dashboard control box for use in conjunction with this device.

FIG. 2 is a plan view of the control box shown in FIG. 1 with the cover portion thereof removed.

FIG. 3 is a sectional elevational view taken substantially along line 3—3 of FIG. 1.

FIG. 4 is a sectional view of the rear indicator taken substantially along line 4—4 of FIG. 5.

FIG. 5 is a sectional view of the rear indicator taken substantially along line 5—5 of FIG. 4.

FIG. 6 is a fractional view of one side of the message indicating tape.

FIG. 7 is a fractional view of the other side of the message indicating tape.

FIG. 8 is a schematic view of the electrical components of this invention.

FIG. 9 is a fractional perspective view of a passenger automobile with this invention installed therein.

Referring to the drawings, which illustrate what may be for some purposes a preferred embodiment of the invention, there is illustrated generally a message indicator 10 positioned at the rear of the vehicle 11. The indicator may be positioned as illustrated herein interior of the rear window 13. It could, however, as well be positioned in any other convenient and available portion of the rear of the vehicle.

The rear message indicator 10 will be comprised essentially of a housing 12, a tape 15 and a window portion 14 of the housing 12 to display a portion of the said tape 15.

The tape 15 will have thereon a series of predetermined messages (see FIG. 7) together with possibly some blank areas for special messages. As the tape is rotated each of the messages on the tape 15 will in turn appear in the window portion 14 of the message indicator 10. In that the said window portion 14, as shown in FIG. 9 faces outward of the rear window 13 of the vehicle 11, it may be easily seen. The housing 12 of the indicator 10 may have a shield 23 (see FIG. 5) of the window portion 14 so that the messages may be seen in daylight, more clearly.

In that it will be desirable to have the messages on the tape visible only when lights within the interior of the indicator 10 are lit, the messages may be printed on the side of the tape 15 which will face interior of the indicator 10. The tape 15 itself will be fabricated of a translucent material. Thus, when viewing the tape 15 from the exterior of the vehicle, when the interior of the indicator 10 is dark, the messages will not be visible. However, when the interior of the indicator 10 is illuminated, as will be described in detail hereinafter, the desired message will be clearly visible through the translucent tape 15. This necessitates the printing of the messages in reverse on the rear side of the tape 15.

Referring to FIGS. 4 and 5, the tape 15 will be wound upon rollers 18 and 19 and will pass over an idler roller 17. One of the rollers 18 will contain either in the center thereof or in a housing 60 at the exterior thereof, a torsion spring which will bias the said roller 18 in the direction of the arrow in FIG. 5 (as for example, on a conventional window shade). Thus, the roller 18 will always provide tension on the tape 15 and will tend to wind the tape 15 thereon against the resistance provided by the opposite roller 19. Roller 19 will be connected at one end to a suitable motor 61 contained within a housing 62. The motor 61 will be of the type that will not allow rotation of its driven shaft except when actuated and will be capable of rotation in either direction.

Thus, the motor 61 will effectively control the position of the tape 15. For example, when the motor 61 rotates so that it unwinds the tape 15 from the shaft 19, the torque provided in connection with the roller 18 will act to wind a portion of the tape 15 onto the said roller 18. When the direction of rotation of the shaft of the motor 61 is reversed, the tape 15 will be wound on the roller 19 against the urging of the torsion roller 18.

In that the tape 15 passes directly rearward of the window portion 14 of the housing 12, any of the messages on the said tape 15 may be urged into the position of the said window 14 merely by suitable rotation of the motor 61.

The rotation of the motor 61 may be controlled by a suitable single pole double throw switch 66 on the panel box 65 positioned at the dashboard for the convenience of the driver of the vehicle. The said switch 66 will serve to connect the vehicle battery with the motor 61 in a desired manner to effect either direction of rotation (see FIG. 8).

Of course, it will be desirable for the driver of the vehicle to be able to ascertain at any moment the exact message indicated by the tape 15 through the indicator window 14. This will be accomplished as explained hereinafter.

The idler roller 17 will be fabricated of an electrically conductive material and will be electrically grounded by a suitable connection 69. The tape 15 will have at suitable positions a plurality of double electrical conducting plates 70. As will be seen in FIGS. 6 and 7, each of the double conducting plates 70 will be laterally offset from the others. They each will consist of double plates, however, to extend from both sides of the tape 15.

Positioned along the housing 12 in juxtaposition the grounded idler roller 17 will be a plurality of staggered contacts 72. Each of the contacts 72 will be positioned to touch one of the double conducting plates 70 at one position of the tape 15.

As will be explained hereinafter, the grounding of any of the contacts 72 will cause a desired indicator lamp to be actuated for the driver. Thus, during the movement of the tape 15, when any of the double conducting plates 70 pass over the idler roller 17, they will be electrically grounding in that they will contact the grounded roller 17. They will, however, simultaneously touch one of the contacts 72 completing the desired electrical circuit for that contact.

Thus, this unique construction provides a mechanism whereby the rotating tape 15 itself indicates its position for the driver of the vehicle.

Positioned at the front dashboard of the vehicle 11 is the control box containing the motor actuating switch 66. Contained within the control box 65 will be two main lamps 81 and an individual lamp 82 corresponding to each of the messages on the tape 15 and for additional stop positions. Each of the lamps 82 will be individually connected through one of the contacts 72 to ground. Thus, any one of the lamps 82 may be lit only when the appropriate contact 72 is grounded through the idler roller 17 as was explained hereinabove.

The positive terminal of each of the lamps 82 will be commonly connected to the positive side of the vehicle power supply 68 through a double pole double throw switch 80 provided on the control box 65. As will be seen in FIG. 8, when the switch 80 is depressed to the left, the power supply will be directly connected to the bulbs 82 so that any of the said bulbs that are grounded through its contact 72, will light. Similarly, when the switch 80 is in that position, both of the bulbs 81 will light in that they are always directly connected to ground. Thus, actuation of the switch 80 to the left will cause the one of the bulbs 82 to light that will indicate the position at that time of the tape 15. In that the top surface of the control box 65 is marked as indicated in FIG. 1, and is fabricated of a translucent material, all of the possible indications will be clearly visible by means of the bulbs 81 and the one of the indicators displayed at the rear of the vehicle will be indicated by the bulb 82 lighting up the box adjacent the desired message.

Contained within the interior of the rear indicator 10, will be a plurality of lamps 90. As was mentioned heretofore, the message on the tape 15 will be visible through the said tape 15 only when the said lamps 90 are lit in that the messages are printed only on the interior side of the translucent tape 15. As will be seen in FIG. 8, the lamps 90 are connected to one side of the power supply 68 through a ground and are connected to the other side of the power supply 68 through a flasher 93 and switch 80. Thus, when switch 80 is actuated to the right in FIG. 8, power is supplied to the flasher 93 causing the same to emit intermittently causing the lamps 90 to light intermittently. This will expose the message on the tape 15 in such a manner as to call attention thereto. Simultaneously the flasher 93 will provide power to each of the bulbs 82. However, only the bulb 82 in the control box 65 that is connected to ground through its contact 72 will intermittently light simultaneously with the rear lamps 90. The bulbs 81 will in this position not be lit. They are, however, no longer needed after the message selection. Furthermore, the message bulb 82 which will intermittently light will emit sufficient light to permit the message being indicated to be read by the driver.

Thus, the operation of this invention will be apparent. It may be installed conveniently in a vehicle at assembly or at any other time thereinafter. The control box 65 will be positioned at the dashboard and may extend slightly therebelow. Thus, a quick disconnect coupling 100 provided as shown in FIG. 3, will be below the dashboard to receive the connecting cable 101. The opposite end of the connecting cable 101 will be conducted to the indicator 10 at the rear of the vehicle and may be quickly installed through a similar quick disconnected coupling 102. Thereby all electrical connections may be easily and quickly made by the connection of one cable 101.

The operator of the vehicle may at any time ascertain what message is exposed at the rear of his vehicle merely by flipping switch 80 to the left. This will light the control box 65 together with the single message then exposed. If he desires to rotate the tape 15 he leaves the switch 80 to the left and depresses switch 66 in either direction. This causes the tape 15 to rotate in the desired direction. As the tape 15 rotates each of the contacts 72 will in turn become grounded as it passes the grounded idler roller 17. When the tape 15 reaches the desired position, as shown by the activation of the proper lamp 82, in the control box 65, the switch 66 is deactivated. The switch 80 is then depressed to the right causing the message at the rear to appear by means of the lamps 90 flashing on and off and further causing the proper lamp 82 in the control box to intermittently be activated thereby demonstrating proper operation of the unit to the driver.

Additional contacts 72 and conducting plates 70 are provided at opposite ends of the tape 15 to indicate in the control box 65 that the tape has reached either end of its travel and that the switch 66 should be oppositely activated. Cutoff relays may further be provided to prevent the motor 61 from continuing to rotate after the tape 15 has reached the limit of winding or unwinding.

While there are above disclosed but a limited number of embodiments of the structure and product of the invention herein presented, it is possible to produce still other embodiments without departing from the inventive concept herein disclosed and it is desired, therefore, that only such limitations be imposed on the appended claims as are stated therein or required by the prior art.

Having thus described our invention and illustrated its use, what we claim as new and desire to secure by Letters Patent is:

1. A message indicator for vehicles comprising, a housing having a window portion, a tape adapted for movement within said housing past said window portion, said tape having the desired messages to be indicated printed thereon, means for selective movement of said tape, said means including a first and a second roller attached to opposite ends of said tape, power means to rotate said first roller in either direction of rotation, said second roller having spring means urging the same to rotate in a direction whereby said tape will be urged to be wound thereon, and unwound from said first roller, whereby actuation of said power means will cause appropriate movement of said tape, and lamp means within said housing, and a flasher unit electrically connected to said lamp means whereby said lamp means will intermittently light when actuated, and a driver panel box having a first switch for control of said power means and a second switch for control of said lamp means, and a plurality of first contact means on said tape, each of said first contact means being positioned for successive electrical grounding of one of a series of second fixed housing contact means, and a plurality of bulbs within said panel box, each of said series of second fixed housing contact means being electrically connected to an individual bulb within said driver panel box whereby the grounding of any of said series of second fixed housing contact means will cause one of said individual bulbs to light, thereby indicating the position of said tape.

2. A message indicator for vehicles as set forth in claim 1, wherein said tape further passes over an idler roller adjacent said series of second contact means, said idler roller being of a conductive material and being electrically grounded, each of said first contact means being positioned to simultaneously touch said idler roller and the corresponding second contact means whereby the grounding of said second contact means is effected.

3. A message indicator for vehicles as set forth in claim 2, wherein said tape is translucent and said messages are printed on the side of said tape interior of said housing.

References Cited by the Examiner

UNITED STATES PATENTS

| | | | |
|---|---|---|---|
| 1,425,879 | 8/1922 | McNicholas | 40—77 |
| 1,829,037 | 10/1931 | Bobroff | 200—6 |
| 1,949,519 | 3/1934 | Wagenhals | 40—13 |
| 2,084,202 | 6/1937 | Kempien | 340—325 |
| 2,565,079 | 8/1951 | Kern | 40—77 |
| 2,878,462 | 3/1959 | Tralli | 340—107 |

NEIL C. READ, *Primary Examiner.*

WALTER GLEICHMAN, IRVING J. LEVIN,
*Assistant Examiners.*